(12) United States Patent
Muramatsu

(10) Patent No.: US 6,766,403 B2
(45) Date of Patent: Jul. 20, 2004

(54) CPU SYSTEM WITH HIGH-SPEED PERIPHERAL LSI CIRCUIT

(75) Inventor: Eiji Muramatsu, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 539 days.

(21) Appl. No.: 09/850,235

(22) Filed: May 7, 2001

(65) Prior Publication Data

US 2001/0044871 A1 Nov. 22, 2001

(30) Foreign Application Priority Data

May 19, 2000 (JP) ........................................ 2000-148303

(51) Int. Cl.[7] .............................................. G06F 13/14
(52) U.S. Cl. ............................ 710/305; 710/60; 710/61; 713/400
(58) Field of Search ............................. 710/58–61, 305; 711/167–169; 713/400

(56) References Cited

U.S. PATENT DOCUMENTS

| | | | |
|---|---|---|---|
| 4,354,227 A | * | 10/1982 | Hays et al. .................. 710/240 |
| 5,448,715 A | | 9/1995 | Lelm et al. |
| 5,768,560 A | | 6/1998 | Lieberman et al. |
| 5,804,749 A | * | 9/1998 | Shirakawa et al. ............ 84/601 |
| 5,949,011 A | * | 9/1999 | Ichiki .......................... 84/602 |
| 6,434,674 B1 | * | 8/2002 | DeWilde et al. ............. 711/149 |
| 6,513,094 B1 | * | 1/2003 | Magro ......................... 711/103 |
| 2002/0030687 A1 | * | 3/2002 | Nakatsuka et al. .......... 345/534 |

FOREIGN PATENT DOCUMENTS

| | | |
|---|---|---|
| EP | 0 897 154 A2 | 2/1999 |
| JP | 09218846 A | 8/1997 |

* cited by examiner

*Primary Examiner*—Sumati Lefkowitz
(74) *Attorney, Agent, or Firm*—Scully, Scott, Murphy & Presser

(57) ABSTRACT

A CPU system employs a general-purpose peripheral LSI circuit and a high-speed memory for the peripheral LSI circuit. A selector determines whether access from a CPU is directed to an internal circuit of the peripheral LSI circuit or an SDRAM. If the access is directed to the SDRAM, the selector stores a bus signal in a timing adjusting circuit and then reads the stored bus signal at a rate that is at least twice the rate at which the bus signal has been stored. An SDRAM interface accesses the SDRAM with the read bus signal. The internal circuit accesses the SDRAM while bus arbitration is being carried out between the internal circuit and the SDRAM interface.

6 Claims, 5 Drawing Sheets

CPU SYSTEM WITH HIGH-SPEED PERIPHERAL LSI CIRCUIT

BACKGROUND OF THE INVENTION

1. Field of the Invention

The present invention relates to a CPU system with a peripheral LSI circuit to which an SDRAM is connected, and more particularly to a CPU system that permits the CPU to access an SDRAM connected to a peripheral LSI circuit.

2. Description of the Related Art

Some CPU systems have a peripheral LSI circuit such as a graphics LSI circuit for enabling the computer to have various functions. Such CPU systems may have a unified memory architecture to reduce the size and cost thereof. The unified memory architecture allows a memory for a peripheral LSI circuit, such as a graphics memory, and a main memory to be realized as one memory. One approach to construct a unified memory architecture is to arrange a CPU system such that the CPU is capable of accessing a memory for a peripheral LSI circuit.

As shown in FIG. 1 of the accompanying drawings, a conventional CPU system has CPU 5, peripheral LSI circuit 6, and SDRAM 7. CPU 5 serves as a main processor of the conventional CPU system. Peripheral LSI circuit 6 has wait control bus interface 61, selector 62, SDRAM interface 63, and internal circuit 64.

Wait control bus interface 61 is connected to the bus of CPU 5, and performs a read/write process in response to access from CPU 5 to peripheral LSI circuit 6. In the read/write process, wait control bus interface 61 places CPU 5 in a wait mode according to a wait control process in view of the period of time that is required for a response from SDRAM 7 to be transmitted to CPU 5. Selector 62 is a selector for relaying an exchange with wait control bus interface 61 to a selected one of SDRAM interface 63 and internal circuit 64. Specifically, when access is made from CPU 5 to SDRAM 7, selector 62 selects SDRAM interface 63, and when access is made from CPU 5 to internal circuit 64, selector 62 selects internal circuit 64. SDRAM interface 63 is connected to SDRAM 7 and receives a bus signal from and sends a bus signal to SDRAM 7.

Internal circuit 64 is a circuit for realizing the functions of peripheral LSI circuit 6, and has a structure that may differ depending on the application of peripheral LSI circuit 6. Internal circuit 64 may have a processor therein. SDRAM 7 is connected to peripheral LSI circuit 6 by SDRAM interface 63, and can be accessed from CPU 5 via peripheral LSI circuit 6.

In the conventional CPU system shown in FIG. 1, peripheral LSI circuit 6 with the wait control general-purpose bus performs the wait control process in view of the period of time that is required for a response from SDRAM 7 to be transmitted to CPU 5, and allows CPU 5 to access SDRAM 7 that is connected to peripheral LSI circuit 6.

FIG. 2 of the accompanying drawings shows another conventional CPU system. The conventional CPU system shown in FIG. 2 has CPU 5, peripheral LSI circuit 8, and SDRAM 7. CPU 5 serves as a main processor of the conventional CPU system. Peripheral LSI circuit 8 has selector 81, SDRAM interface 82, and internal circuit 83.

Selector 81 is a selector for relaying an exchange with CPU 5 to a selected one of SDRAM interface 82 and internal circuit 83. Specifically, when access is made from CPU 5 to SDRAM 7, selector 81 selects SDRAM interface 82, and when access is made from CPU 5 to internal circuit 83, selector 62 selects internal circuit 83.

Internal circuit 83 is a circuit for realizing the functions of peripheral LSI circuit 8, and has a structure that may differ depending on the application of peripheral LSI circuit 8. Internal circuit 83 may have a processor therein. SDRAM 7 is connected to peripheral LSI circuit 8 by SDRAM interface 82, and can be accessed from CPU 5 via peripheral LSI circuit 8.

In the conventional CPU system shown in FIG. 2, selector 81 switches over access from CPU 5 based on the address contained therein to allow CPU 5 to access SDRAM 7 that is connected to peripheral LSI circuit 8.

SUMMARY OF THE INVENTION

It is an object of the present invention to provide a CPU system which is of a low cost and a reduced circuit scale and which includes a general-purpose peripheral LSI circuit and a high-speed memory for the peripheral LSI circuit.

To achieve the above object, a CPU system according to the present invention has a CPU, a peripheral LSI circuit, and an SDRAM.

The peripheral LSI circuit has a first interface connected to an SDRAM interface of the CPU and a second interface for accessing an external circuit. The peripheral LSI circuit determines whether access from the CPU via the first interface is directed to an internal circuit of the peripheral LSI circuit or the external circuit. If the access from the CPU is directed to the external circuit, then the peripheral LSI circuit stores a first bus signal from the first interface, adjusts the timing of the stored first bus signal and reads the first bus signal to generate a second bus signal having a rate which is at least twice the rate of the first bus signal, and accesses the external circuit from the second interface with the second bus signal. The SDRAM is connected to the second interface and accessible by the second bus signal.

Since the first interface is the same as the interface of the SDRAM, the CPU system can be constructed of a general-purpose peripheral LSI circuit that can be connected to a CPU having an interface with the SDRAM.

Because the peripheral LSI circuit adjusts the timing of access to the SDRAM, the CPU is capable of accessing the SDRAM with the same timing that it would access an SDRAM directly connected to the CPU.

According to one aspect of the invention, the internal circuit can access the SDRAM while bus arbitration is being carried out between the internal circuit and the SDRAM interface. As the internal circuit of the peripheral LSI circuit can access the SDRAM, the CPU system can employ a unified memory architecture. Because the second interface has a rate that is at least twice the rate of the first interface, the bandwidth of the memory for the peripheral LSI circuit is at least twice the bandwidth of the main memory for the CPU.

According to one aspect of the invention, a double data rate SDRAM takes the place of the SDRAM.

According to another aspect of the invention, there is also provided a peripheral LSI circuit connectable to a CPU for realizing predetermined functions, comprising an internal circuit, a selector, a timing adjusting circuit, and an SDRAM interface.

The internal circuit realizes the predetermined functions. The selector determines whether access from the CPU is directed to the internal circuit or an external circuit. The selector reads data from or writes data in the internal circuit if the access from the CPU is directed to the internal circuit. The selector sends the access from the CPU as a first bus signal if the access from the CPU is directed to the external circuit. The timing adjusting circuit stores the first bus signal and reads the stored first bus signal with predetermined timing to generate and output a second bus signal having a rate which is at least twice the rate of the first bus signal. The SDRAM interface accesses an SDRAM connected as the external circuit with the second bus signal from the timing adjusting circuit.

According to one aspect of the invention, in the peripheral LSI circuit, the internal circuit comprises an access circuit for accessing the SDRAM and an arbitration circuit for carrying out bus arbitration between the access circuit and the SDRAM interface.

According to one aspect of the invention, in the peripheral LSI circuit, a double data rate SDRAM is connected as the external circuit in place of the SDRAM.

The above and other objects, features, and advantages of the present invention will become apparent from the following description with reference to the accompanying drawings which illustrate examples of the present invention.

DESCRIPTION OF THE PREFERRED EMBODIMENTS

Figure 1:
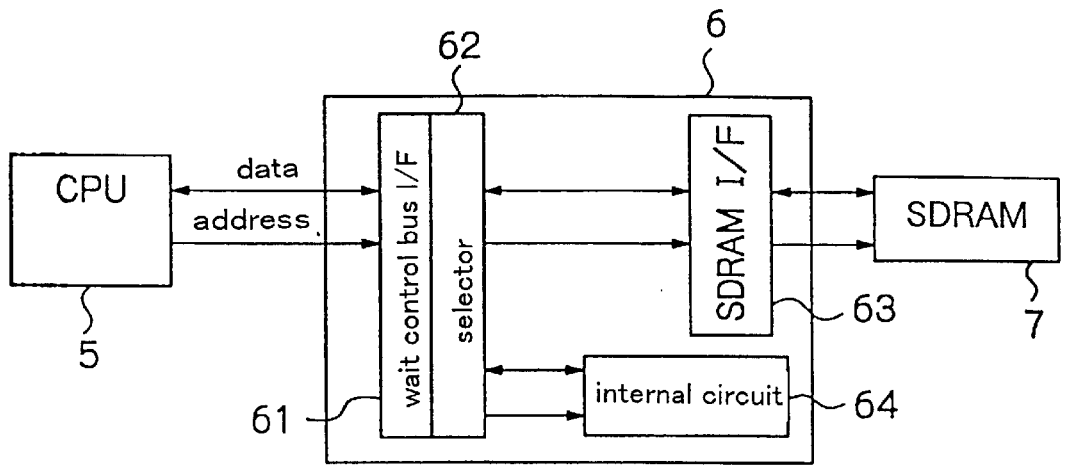
FIG. 1 is a block diagram of a conventional CPU system which adjusts the timing to access an SDRAM connected to a peripheral LSI circuit according to a wait control process.
Figure 2:
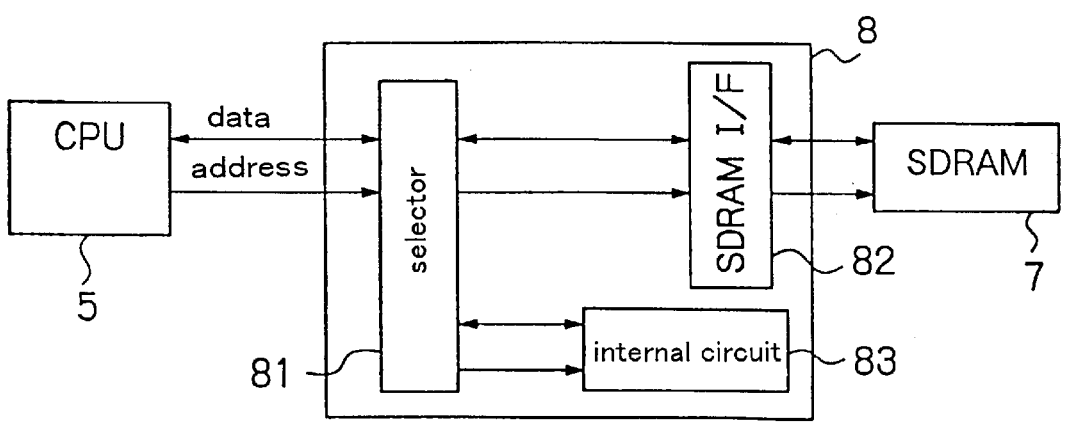
FIG. 2 is a block diagram of a conventional CPU system which allows access to an SDRAM connected to a peripheral LSI circuit by operating a selector based on the address.
Figure 3:
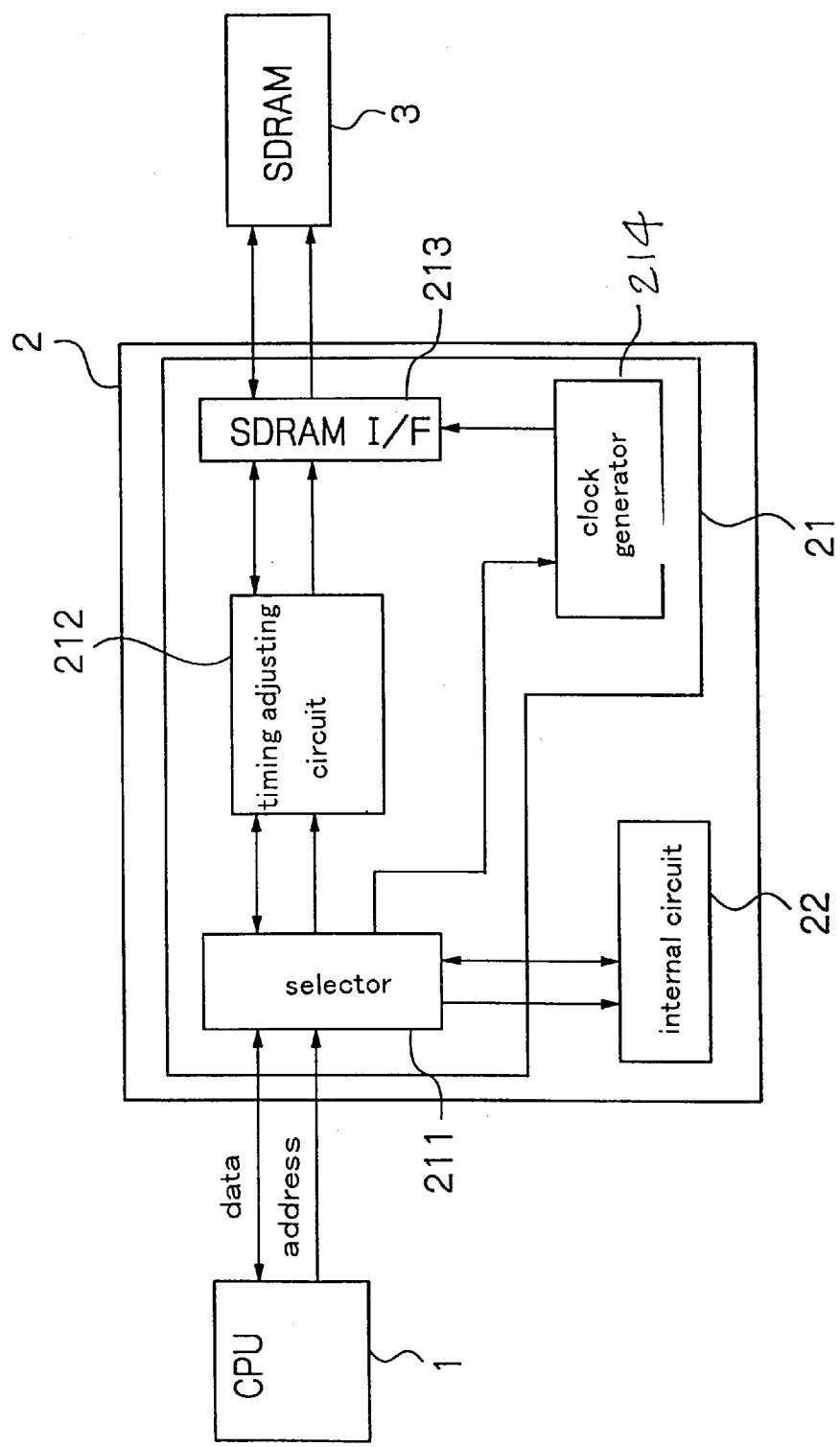
FIG. 3 is a block diagram of a CPU system according to an embodiment of the present invention.

As shown in FIG. 3, a CPU system according to an embodiment of the present invention comprises CPU 1, peripheral LSI circuit 2, and SDRAM 3.

CPU 1 serves as a main processor of the CPU system. Peripheral LSI circuit 2 has interface assembly 21 and internal circuit 22. Interface assembly 21 comprises selector 211, timing adjusting circuit 212, SDRAM interface 213, and clock generator 214.

Selector 211 can be connected to an SDRAM interface of CPU 1, and operates in the same manner as SDRAM 3 with respect to CPU1. Selector 211 performs a read/write process on SDRAM 3 or internal circuit 22 in response to access from CPU 1 to peripheral LSI circuit 2.

Timing adjusting circuit 212 comprises an FIFO memory for writing data from CPU 1 and reading data to SDRAM 3 and an FIFO memory for writing data from SDRAM 3 and reading data to CPU 1. Timing adjusting circuit 212 adjusts the timing of access from CPU 1, and controls a bus signal for SDRAM 3. A clock signal for the bus that is connected to SDRAM 3 has a rate that is at least twice the rate of a clock signal for the bus that is connected to CPU 1.

SDRAM interface 213 is connected to SDRAM 3, and inputs a bus signal from and outputs a bus signal to SDRAM 3.

Clock generator 214 generates a clock signal based on the clock signal for the bus connected to CPU 1 at a rate that is at least twice the rate of the clock signal for the bus connected to CPU 1 and supplies the generated clock signal to SDRAM interface 213 for use by the bus connected to SDRAM 3.

Internal circuit 22 is a circuit for realizing the main functions of peripheral LSI circuit 2, and has a structure that may differ depending on the application, e.g., graphics application, of peripheral LSI circuit 2. Internal circuit 22 may have a processor therein.

SDRAM 3 is connected to peripheral LSI circuit 2 by SDRAM interface 213, and can be accessed from CPU 1 via peripheral LSI circuit 2.

Figure 4:
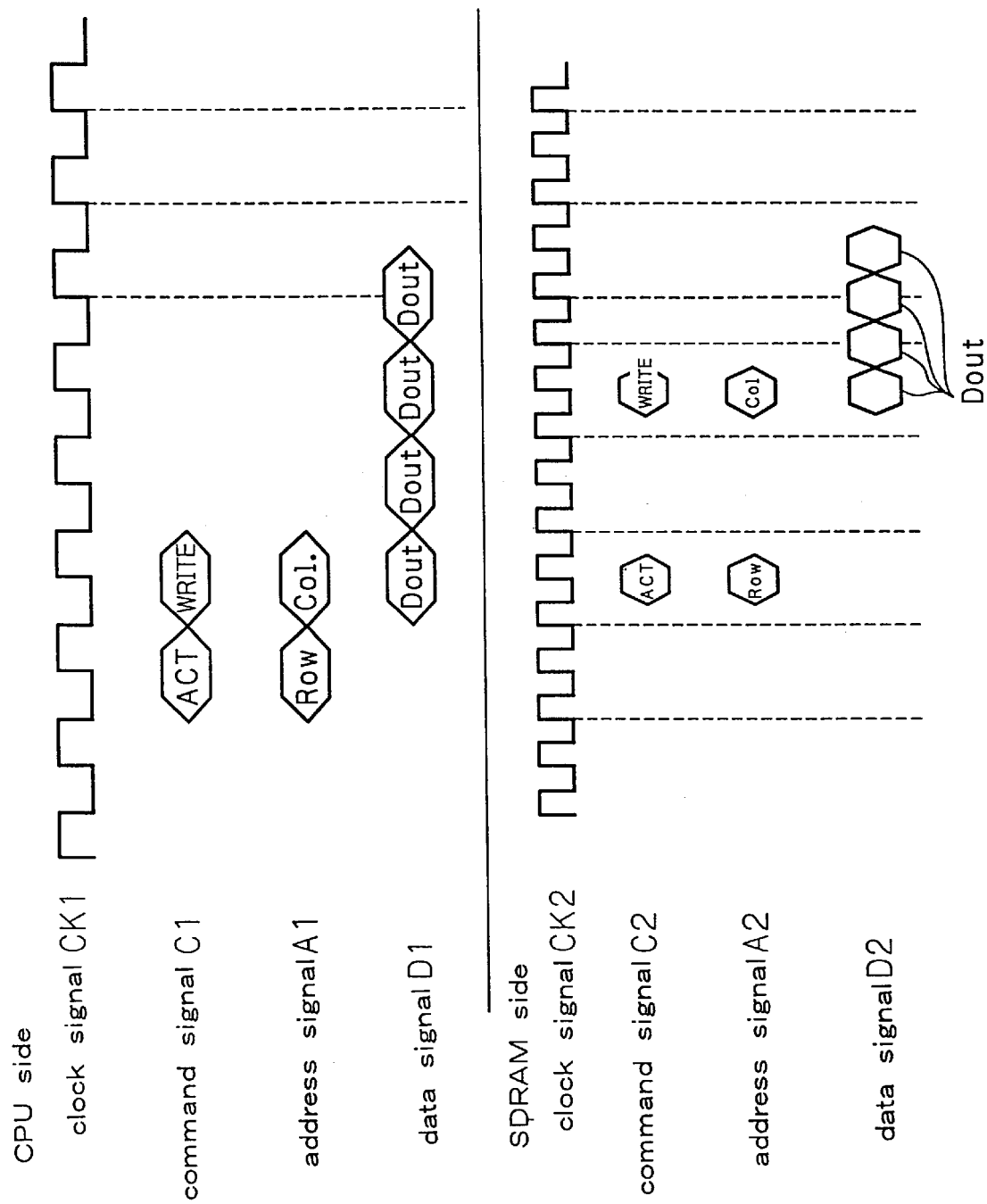
FIG. 4 is a timing chart of a write process for a CPU to write data in an SDRAM in the CPU system shown in FIG. 3.
Figure 5:
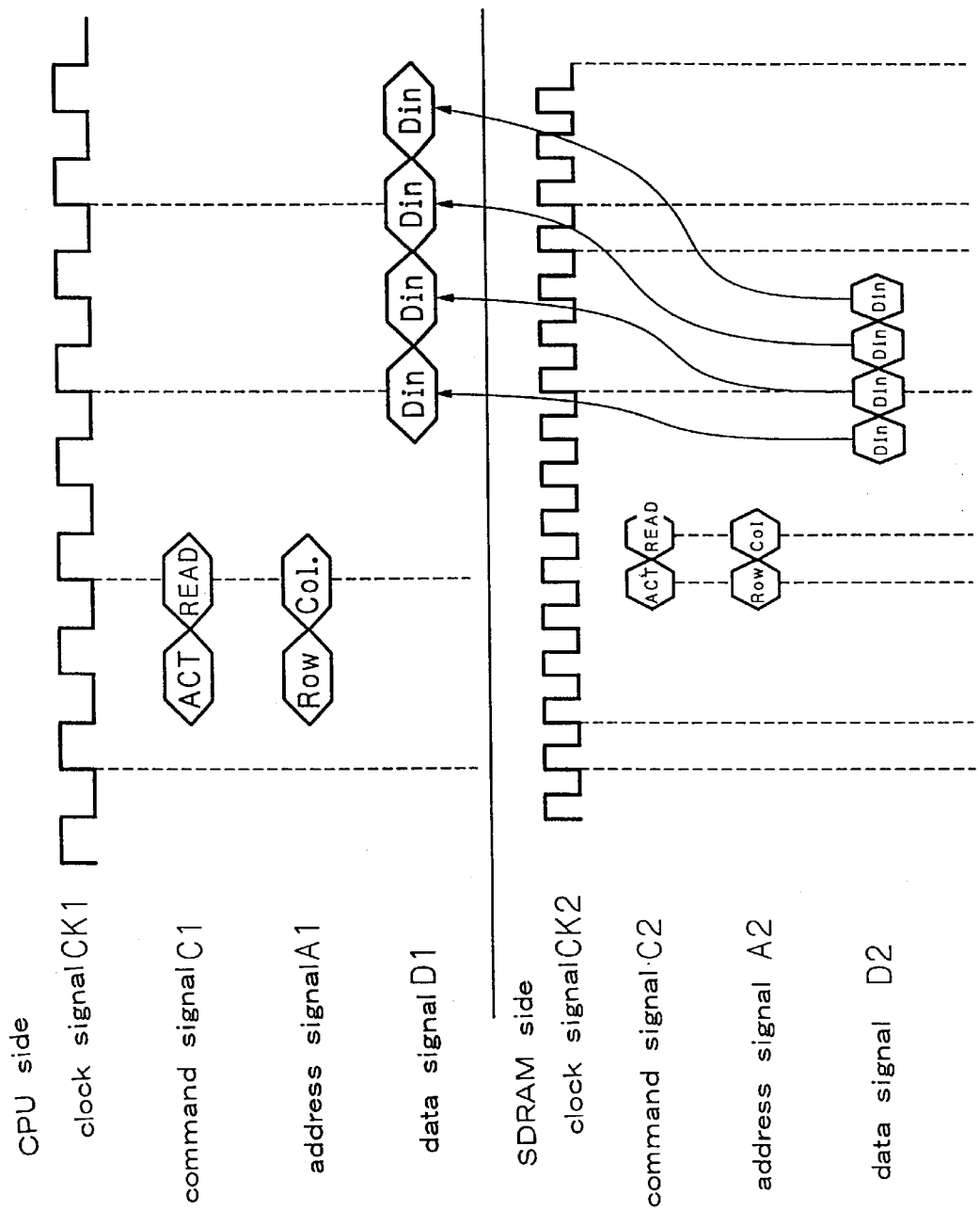
FIG. 5 is a timing chart of a read process for the CPU to read data from the SDRAM in the CPU system shown in FIG. 3.

FIG. 4 shows a timing chart of a write process for CPU 1 to write data in SDRAM 3 in the CPU system. FIG. 5 shows a timing chart of a read process for CPU 1 to read data from SDRAM 3 in the CPU system. FIGS. 4 and 5 illustrate clock signal CK1, command signal C1, address signal A1, and data signal D1 that are included in the bus signal for CPU 1, and clock signal CK2, command signal C2, address signal A2, and data signal D2 that are included in the bus signal for SDRAM 3.

The CPU system according to the present embodiment operates as follows: When peripheral LSI circuit 2 receives an active command (ACT) on command signal C1 and a row address (Row) on address signal A1, peripheral LSI circuit 2 determines whether the access from CPU 1 is directed to SDRAM 3 or internal circuit 22. If the access is directed to internal circuit 22, then selector 211 relays subsequent access to internal circuit 22. If the access is directed to SDRAM 3, then timing adjusting circuit 212 adjusts the timing of the access and sends signals to the bus connected to SDRAM 3.

As shown in FIG. 4, in the write process for CPU 1 to write data in SDRAM 3, after peripheral LSI circuit 2 sends an active command on command signal C2 for SDRAM 3 and a row address (Row) on address signal A2, the CPU system delays the issuance of a next command to SDRAM 3 until sufficient data (Dout) are received from CPU 1. After sufficient data are received from CPU 1, the CPU system outputs a write command (WRITE) on command signal C2, sends a column address (Col) on address signal A2, and sends data (Dout) on data signal D2, thus writing data in SDRAM 3. When the write process for CPU 1 to write data in SDRAM 3 is delayed, a clock enable (CKE) signal may be controlled to place the CPU system in a power-down mode, or a precharge command may be applied to bring the CPU system back into an idle mode.

As shown in FIG. 5, in the read process for CPU 1 to read data from SDRAM 3, when peripheral LSI circuit 2 receives a read command (READ) on command signal C1 and a column address (Col) on address signal A1 from CPU 1, peripheral LSI circuit 2 starts accessing SDRAM 3.

The bus signal for SDRAM 3 operates with a clock at a rate that is at least twice (twice in FIG. 5) the rate of the bus signal for CPU 1. Therefore, data (Din) are read with data signal D2 for SDRAM 3 in order to meet the timing to output data (Din) on data signal D1 for CPU 1 at CAS latency=2, and stored in timing adjusting circuit 212. The stored data are read from timing adjusting circuit 212 in synchronism with the timing for CPU 1, and are sent on data signal D1.

Since the portion of peripheral LSI circuit 2 which is connected to CPU 1 comprises an SDRAM interface, the CPU system can be constructed of peripheral LSI circuit 2 that can be connected to any CPUs having an SDRAM interface. Thus, peripheral LSI circuit 2 may be connected to many CPUs.

Furthermore, because peripheral LSI circuit 2 adjusts the timing to access SDRAM 3, CPU 1 can access SDRAM 3 that is connected to peripheral LSI circuit 2 with the same timing that it would access an SDRAM directly connected to CPU 1. As a result, the data transfer rate is not lowered.

The CPU system according to the present embodiment allows CPU 1 to access SDRAM 3 by the process of burst data access or single data access.

Inasmuch as CPU 1 can access SDRAM 3 for burst data with the timing adjusted by peripheral LSI circuit 2, it is possible to transfer data at a high rate.

Figure 6:
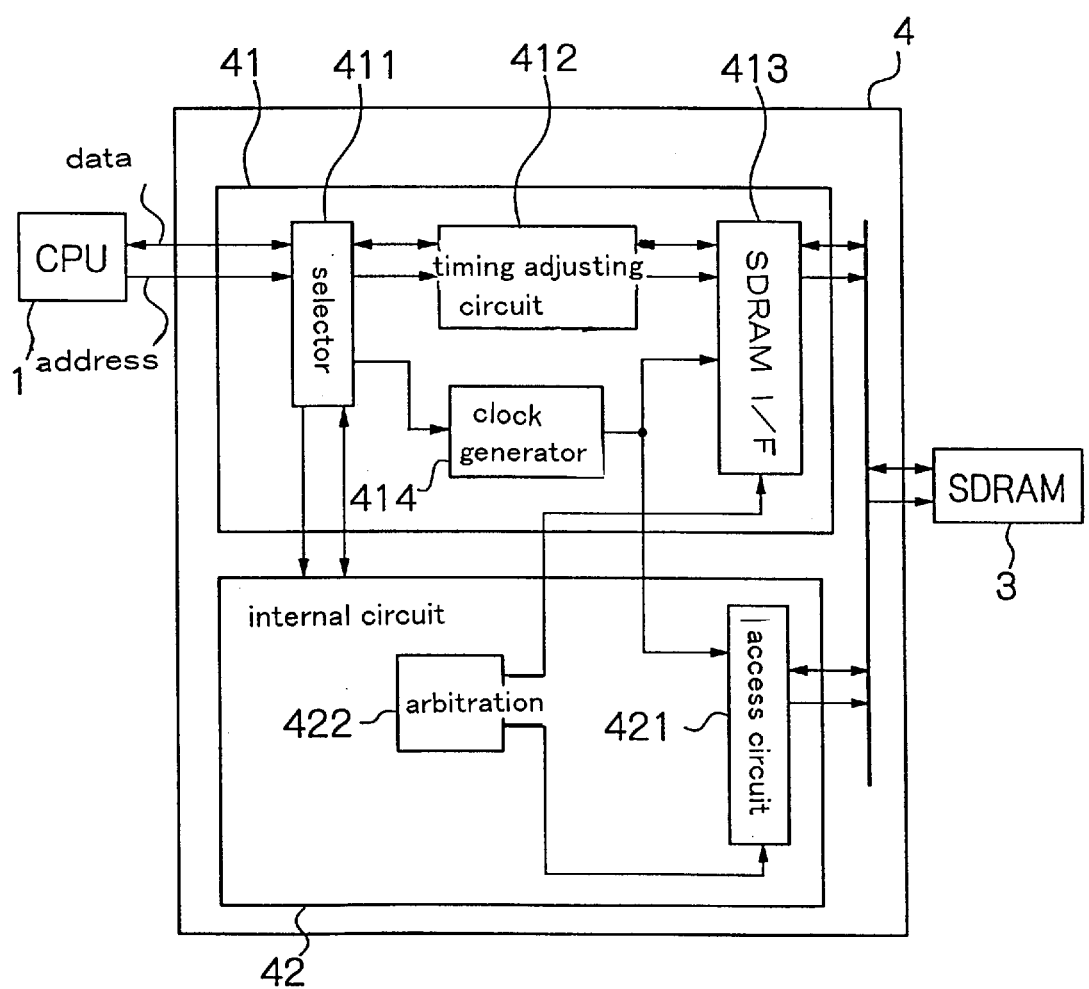
FIG. 6 is a block diagram of a CPU system according to another embodiment of the present invention.

As shown in FIG. 6, a CPU system according to another embodiment of the present invention has CPU 1, peripheral LSI circuit 4, and SDRAM 3. CPU 1 and SDRAM 3 shown in FIG. 6 are identical to those of the CPU system shown in FIG. 3.

Peripheral LSI circuit 4 has interface assembly 41 and internal circuit 42. Interface assembly 41 comprises selector 411, timing adjusting circuit 412, SDRAM interface 413, and clock generator 414.

Selector 411 can be connected to an SDRAM interface of CPU 1, and operates in the same manner as SDRAM 3 with respect to CPU1. Selector 411 performs a read/write process on SDRAM 3 or internal circuit 42 in response to access from CPU 1 to peripheral LSI circuit 4.

Timing adjusting circuit 412 comprises an FIFO memory for writing data from CPU 1 and reading data to SDRAM 3 and an FIFO memory for writing data from SDRAM 3 and reading data to CPU 1. Timing adjusting circuit 412 adjusts the timing of access from CPU 1, and controls a bus signal for SDRAM 3. A clock signal for the bus that is connected to SDRAM 3 has a rate that is at least twice the rate of a clock signal for the bus that is connected to CPU 1.

SDRAM interface 413 is connected to SDRAM 3, and is arbitrated by an external circuit to receive a bus signal from and send a bus signal to SDRAM 3.

Clock generator 414 generates a clock signal based on the clock signal for the bus connected to CPU 1 at a rate that is at least twice the rate of the clock signal for the bus connected to CPU 1. Clock generator 414 supplies the generated clock signal to SDRAM interface 413 for use by the bus connected to SDRAM 3.

Internal circuit 42 is a circuit for realizing the main functions of peripheral LSI circuit 4, and has access circuit 421 and arbitration circuit 422. Access circuit 421 allows internal circuit 42 to access SDRAM 3. Arbitration circuit 422 performs bus arbitration between SDRAM interface 412 and access circuit 421 for access to SDRAM 3.

The CPU system shown in FIG. 6 allows CPU 1 to access SDRAM 3 and also allows internal circuit 42 in peripheral LSI circuit 4 to access SDRAM 3. As a result, the CPU system can employ a unified memory architecture, and can be reduced in size and cost.

The bus signal for the SDRAM 3 is of a rate that is at least twice the rate of the bus signal for CPU 1. Consequently, in a unified memory architecture, the bandwidth of the memory for peripheral LSI circuit 4 is at least twice the bandwidth of the main memory for CPU 1. If a large bandwidth is preferable for a graphics LSI circuit, for example, the memory for peripheral LSI circuit 4 can have a large bandwidth without involving a difficult design task for speeding up the entire bus of CPU 1.

The principles of the present invention are also applicable to a CPU system which uses a memory, e.g., a DDR SDRAM (double data rate SDRAM), for transferring data in synchronism with positive- and negative-going edges of clock signals.

While preferred embodiments of the present invention have been described using specific terms, such description is for illustrative purposes only, and it is to be understood that changes and variations may be made without departing from the spirit or scope of the following claims.

What is claimed is:

1. A CPU system comprising:

a CPU;

a peripheral LSI circuit having a first interface connected to an SDRAM interface of said CPU and a second interface for accessing an external circuit, for determining whether access from said CPU via said first interface is directed to an internal circuit of the peripheral LSI circuit or the external circuit, storing a first bus signal from said first interface if the access from said CPU is directed to the external circuit, adjusting the timing of the stored first bus signal and reading the first bus signal to generate a second bus signal having a rate which is at least twice the rate of said first bus signal, and accessing the external circuit from said second interface with said second bus signal; and an SDRAM, serving as said external circuit, connected to said second interface and accessible by said second bus signal.

2. A CPU system according to claim 1, wherein said internal circuit comprises means for accessing said SDRAM while bus arbitration is being carried out between the internal circuit and said SDRAM interface.

3. A CPU system according to claim 1, wherein a double data rate SDRAM takes place of said SDRAM.

4. A peripheral LSI circuit connectable to a CPU for realizing predetermined functions, comprising:

an internal circuit for realizing the predetermined functions;

a selector for determining whether access from said CPU is directed to said internal circuit or an external circuit, reading data from or writing data in said internal circuit if the access from said CPU is directed to said internal circuit, and sending a bus signal from said CPU as a first bus signal if the access from said CPU is directed to said external circuit;

a timing adjusting circuit for storing said first bus signal and reading the stored first bus signal with predetermined timing to generate and send a second bus signal having a rate which is at least twice the rate of said first bus signal; and an SDRAM interface for accessing an SDRAM connected as said external circuit with said second bus signal from said timing adjusting circuit.

5. A peripheral LSI circuit according to claim 4, wherein said internal circuit comprises:

an access circuit for accessing said SDRAM; and an arbitration circuit for carrying out bus arbitration between said access circuit and said SDRAM interface.

6. A peripheral LSI circuit according to claim 4, wherein a double data rate SDRAM is connected as said external circuit in place of said SDRAM.

* * * * *